Figure 1:
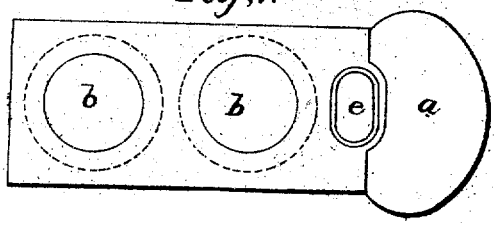
Figure 2:
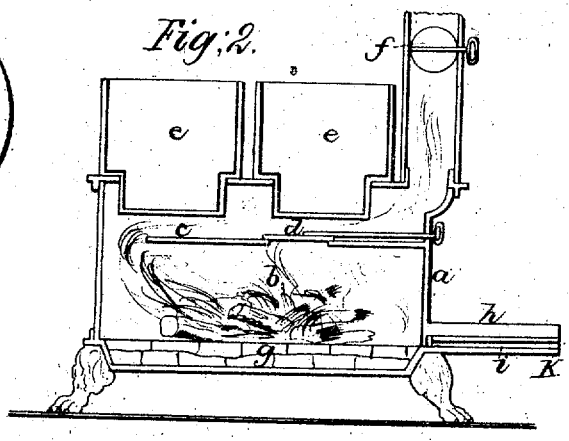
Figure 3:
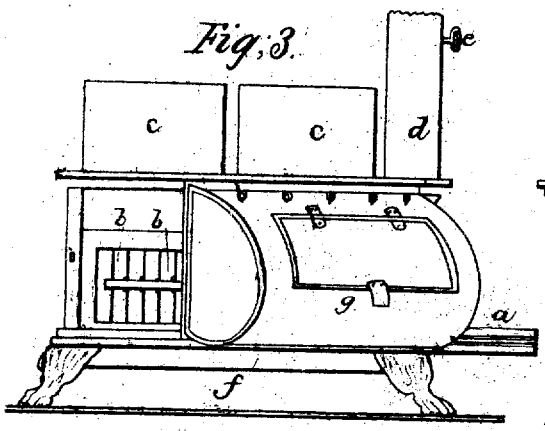
Figure 4:
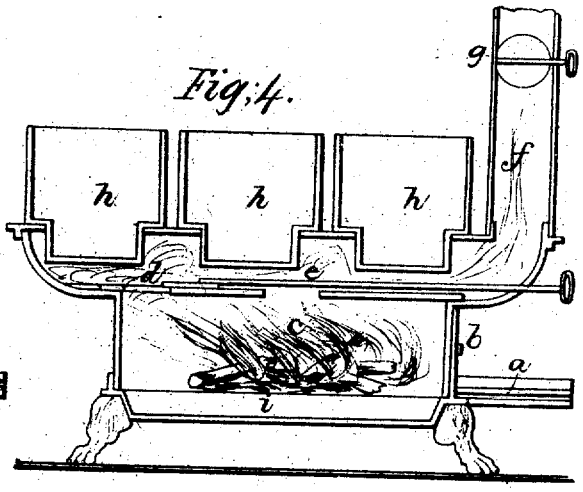

E. Nott,

8790X

Cook Stove.

Patented Apr. 22. 1835.

Apr 22. 1835

Eliphalet Nott.

8790X

Letters Patent

The Schedule referred to in these Letters Patent and making
part of the same containing a description in the words of the said
Eliphalet Nott, himself of his improvement in the Plain plate or
box Cook stove, having an interior ~~oven~~, a return kettle flue
and its inlet for fuel at the end.

---

Whereas inconveniences has arisen in the use of said stove on
account of the waste of fuel and the unequal distubution of
heat in the oven, therefore certain improvements have been intro-
duced which consist — 1. In combining with said interior oven doors
made of tin or other reflecting material, in place of cast or sheet iron
doors; Or. 2. in dispensing with said interior oven altogether, and
in combining in place thereof, with the furnace and kettle flue,
exterior side bake ovens, and roasters or other culinary instruments
in tin or other reflecting Material, each having if desired, aper-
tures governed by valves, on the upper or under side, or on both for the
admission of air, when necessary for regulating the temperature or
improving the flavor; which combinations may be effected by
adapting to each other the sides of said stove and the face of said
instruments, in form, size and structure, so as to make when com-
bined a regular fit; and by connecting the two by hanging the latter
aside the former, like doors so as to open and shut, and ship
and unship, or by providing for the adjustment of the latter aside
the former, by means of rollers, wags, hatches, hooks, or any other
fixture preferred for the purpose. 3. In combining in said stove
with the return kettle flue and exterior side ovens aforesaid
if desired, a furnace more or lep contracted by keeping so
much of the side plates, as lie below the return flue, and thus
forming a seat for the bottom plate thereof; and also for a lining
if in

8790X if in use, as well as for keeping the side Ovens from touching the furnace. 4. In combining in said Stove, with said exterior side ovens, return flue and furnace, whether contracted or not, a brick or other nonconducting lining for the bottom and end of the furnace, and if desired, for the sides of the return flue, or for both: the lining of the flue may consist of a mere coat of Mortar, held in place by numerous small points, projected from the side plate; and in further com=bining with said exterior side Ovens an end door having vertical gudgeons, a fixed latch, and being fastened by the raising and falling of said door, in the cast sockets provided therefor; and if desired, in further combining with said Ovens a projecting hearth plate with a raised Margin, pierced for the admission of air in front, between said hearth plate and ~~and~~ a parallel grated plate for receiving coal for boiling.

5. In combining in said Stove with said exterior reflecting side Ovens and furnace, whether contracted or not, sides plates, pierced for the escape of steam from the ovens that adjoin them to the return flue. 6. In combining in said Stove with said exterior reflecting side Ovens and furnace, a return flue, having the bottom plate thereof so pierced and governed by valves, as to direct the flame to, or from a contained kettle at pleasure. 7. In combining in said Stove with said exterior reflecting side Ovens, an elongated return flue, that is, a flue that projects beyond, or overhangs the furnace, either at one or both ends, said flue having its bottom plate, if desired pierced and governed by valves, as aforesaid.—

8. In combining in said Stove with said exterior reflecting side Ovens, guard plates, either fixed or moveable in the form of blinds, for checking, equalizing and controlling the lateral radiation from the furnace; said guard plates being attached either to the Stove, or to the side Ovens connected therewith.

9. In combining in said reflecting side Ovens, a central roll ing

8790X floor, centered on a horizontal axis in such manner as that by turning the same, the bottom of the articles baking on said floor can be more or less exposed to the direct heat from the side of the furnace.

For further information, reference may be had to the explanations and drawings connected herewith.

Claim. I claim as my inventions, each and all of the [illegible] improvements in said plate or box stove, and separately [illegible] set forth in each and all of the above enumerated combinations, together with the uses to which the same have been or may be hereafter applied.

Eliphᵗ Nott.

Witnesses
S. W. Jones
M. B. Jones (Drawing.)

(305 Words)

(Granted April 22. 1835)